US012698667B2

(12) United States Patent
Staser et al.

(10) Patent No.: US 12,698,667 B2
(45) Date of Patent: *Aug. 4, 2026

(54) WINDOW REGULATOR FOR A FRAMELESS SYSTEM

(71) Applicant: INTEVA PRODUCTS, LLC, Troy, MI (US)

(72) Inventors: Brian H. Staser, Oxford, MI (US); Lisa Marie Hopman, Oxford, MI (US)

(73) Assignee: INTEVA PRODUCTS, LLC, Troy, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/117,026

(22) Filed: Mar. 3, 2023

(65) Prior Publication Data

US 2023/0279713 A1 Sep. 7, 2023

Related U.S. Application Data

(60) Provisional application No. 63/316,083, filed on Mar. 3, 2022.

(51) Int. Cl.

| | |
|---|---|
| ***E05F 11/48*** | (2006.01) |
| ***E05D 15/16*** | (2006.01) |
| ***E05F 15/697*** | (2015.01) |

(52) U.S. Cl.

CPC .......... *E05F 11/488* (2013.01); *E05D 15/165* (2013.01); *E05F 11/485* (2013.01);

(Continued)

(58) Field of Classification Search

CPC .. E05F 15/697; E05F 15/689; E05Y 2201/11; E05Y 2201/64; E05Y 2201/654;

(Continued)

(56) References Cited

U.S. PATENT DOCUMENTS

| | | | |
|---|---|---|---|
| 2,987,937 | A | 6/1961 | Sala |
| 4,051,632 | A | 10/1977 | Fukumoto et al. |

(Continued)

FOREIGN PATENT DOCUMENTS

| | | | |
|---|---|---|---|
| CN | 201420461 | Y | 3/2010 |
| CN | 203129828 | U | 8/2013 |

(Continued)

OTHER PUBLICATIONS

French Office Action for French Application No. 22/02626 Issued Jun. 2, 2022, 7 Pages, No English Translation.

(Continued)

*Primary Examiner* — Marcus Menezes

(74) *Attorney, Agent, or Firm* — CANTOR COLBURN LLP

(57) ABSTRACT

A window regulator, including: a first guide rail; a first cursor slidably mounted to the first guide rail; a second guide rail spaced from the first guide rail; a second cursor slidably mounted to the second guide rail; a housing that is not mounted to a lower end of the first guide rail or the second guide rail; a motor mounted to the housing and operably coupled to the first cursor and the second cursor such that operation of the motor will cause the first cursor to slide along the first guide rail and second cursor to slide along the second guide rail; a cable drum rotationally mounted to the housing, the cable drum being operably coupled to the motor and a first cable secured to the cable drum at one end and the first cursor at another end; a second cable secured to the cable drum at one end and the second cursor at another end; a third cable secured to the first cursor at one end and the second cursor at another end; a first cable sheath surrounding the first cable that extends from a first feature of the first guide rail to the housing; a cable tensioner associated with the first cable sheath; a second cable sheath surrounding the (Continued)

second cable that extends from the housing to a second feature of the second guide rail; and a third cable sheath surrounding the third cable that extends from the a second feature of the first guide rail to a first feature of the second guide rail, wherein the window regulator is configured for raising and lowering a window of a frameless door assembly of a vehicle.

14 Claims, 6 Drawing Sheets

(52) U.S. Cl.
CPC ......... *E05F 15/697* (2015.01); *E05Y 2201/11* (2013.01); *E05Y 2201/64* (2013.01); *E05Y 2201/654* (2013.01); *E05Y 2201/664* (2013.01); *E05Y 2201/668* (2013.01); *E05Y 2201/684* (2013.01); *E05Y 2800/28* (2013.01); *E05Y 2800/676* (2013.01); *E05Y 2900/55* (2013.01)

(58) Field of Classification Search
CPC ......... E05Y 2201/684; E05Y 2201/668; E05Y 2201/612; E05Y 2201/672; E05Y 2800/676; E05Y 2800/28; E05Y 2900/55
USPC ........................................................ 49/352
See application file for complete search history.

(56) References Cited

U.S. PATENT DOCUMENTS 4,329,816 A 5/1982 Koike
4,335,541 A 6/1982 Kazewych
4,420,909 A 12/1983 Pickles
4,502,247 A 3/1985 Kobayashi et al.
4,575,967 A * 3/1986 Bickerstaff .............. B60J 10/79 49/211
4,700,508 A 10/1987 Koellner et al.
4,744,172 A 5/1988 Miyauchi
4,819,380 A 4/1989 Trebbi
4,835,907 A 6/1989 Heuchert
4,890,376 A 1/1990 Boileau
5,074,077 A 12/1991 Toyoshima et al.
5,694,717 A 12/1997 Gier
5,832,664 A 11/1998 Tajima et al.
5,924,245 A 7/1999 Manuel et al.
5,950,365 A * 9/1999 Lieb ........................... B60J 1/17 49/352
5,960,588 A 10/1999 Wurm et al.
5,964,063 A 10/1999 Hisano et al.
5,970,658 A 10/1999 Smith
6,354,652 B1 3/2002 Arquevaux et al.
6,516,493 B1 2/2003 Seliger et al.
6,536,164 B1 3/2003 Kirejczyk
6,688,043 B1 2/2004 Feder et al.
6,766,618 B2 * 7/2004 Cardine ................ E05F 11/488 49/502
6,820,370 B2 11/2004 Marscholl
6,874,279 B1 4/2005 Weber et al.
6,910,730 B2 6/2005 Kinoshita et al.
7,047,692 B2 5/2006 Benoit et al.
7,076,918 B2 7/2006 Tatsumi et al.
7,121,044 B2 10/2006 Santaolalla et al.
7,150,493 B2 12/2006 Kinoshita et al.
7,555,868 B2 7/2009 Tenorio et al.
7,617,633 B2 11/2009 Shimura et al.
7,793,464 B2 9/2010 Buecker et al.
7,797,882 B2 * 9/2010 Lubaway .............. E05F 11/445 49/352
7,877,932 B2 * 2/2011 Kriese ........................ B60J 1/17 49/502
7,882,658 B2 2/2011 Staser et al.
8,109,039 B2 2/2012 Krueger et al.
8,671,621 B2 3/2014 Yoshida et al.
8,776,438 B2 7/2014 Pleiss et al.
8,844,198 B2 9/2014 Raisoni et al.
8,844,199 B2 9/2014 Scharf et al.
8,935,886 B2 1/2015 Pavlovic et al.
8,943,665 B2 2/2015 Walawender et al.
9,163,448 B2 10/2015 Imaoka
9,580,953 B1 2/2017 Matsushita
10,221,608 B2 3/2019 Fever et al.
10,273,733 B2 4/2019 Huang et al.
10,309,140 B2 6/2019 Imaoka
10,669,764 B2 6/2020 Fortin
10,676,975 B2 6/2020 Fortin et al.
10,711,502 B2 7/2020 Yokoyama et al.
10,829,973 B2 11/2020 Hazon et al.
11,125,002 B2 9/2021 Pavlovic et al.
11,162,291 B2 11/2021 Reames et al.
11,674,348 B2 * 6/2023 Krieger ..................... F16C 1/08 49/352
12,281,511 B2 4/2025 Ramesh et al.
2003/0029092 A1 2/2003 Bertolini et al.
2003/0101654 A1 6/2003 Dufour
2003/0106267 A1 * 6/2003 Dron ..................... E05F 11/488 49/374
2004/0227376 A1 11/2004 Kinoshita et al.
2004/0237699 A1 12/2004 Kinoshita et al.
2006/0143985 A1 * 7/2006 Garcia Martin ...... E05F 11/488 49/352
2006/0174542 A1 8/2006 Bernard et al.
2007/0180773 A1 8/2007 Fortin et al.
2007/0193119 A1 8/2007 Hoffman
2007/0220811 A1 9/2007 Flendrig et al.
2007/0277441 A1 12/2007 Smith et al.
2008/0005971 A1 1/2008 Dickie et al.
2009/0265993 A1 10/2009 Shah et al.
2010/0223852 A1 9/2010 Arimoto et al.
2011/0047878 A1 3/2011 Raisoni et al.
2013/0098183 A1 4/2013 Fever et al.
2013/0219794 A1 8/2013 Nakamura et al.
2013/0318876 A1 12/2013 Takakura et al.
2014/0237900 A1 8/2014 Imaoka
2015/0101252 A1 4/2015 Baba
2016/0047411 A1 2/2016 Simonneau et al.
2017/0268273 A1 9/2017 Matsushita
2019/0226264 A1 7/2019 Shiroma
2019/0390757 A1 12/2019 Matsushita
2020/0157870 A1 5/2020 Staser
2022/0136298 A1 5/2022 Staser et al.
2022/0145687 A1 5/2022 Trautmann et al.
2022/0186544 A1 * 6/2022 Krieger ..................... F16C 1/08
2022/0213729 A1 7/2022 Staser et al.

FOREIGN PATENT DOCUMENTS

CN 108005519 A 5/2018
CN 110409950 A 11/2019
CN 111236789 A 6/2020
CN 211173657 U 8/2020
CN 217780190 U 11/2022
DE 19836705 A1 2/2000
DE 102008000477 A1 9/2009
DE 102013104602 A1 11/2014
FR 2832753 A1 5/2003
JP H1136712 A 2/1999
JP 2015200148 A 11/2015
JP 2019138117 A 8/2019
KR 970027629 A 6/1997
KR 19990027962 U 7/1999
KR 20070101728 A 10/2007
KR 1020110043370 A 4/2011
KR 20130065010 A 6/2013
WO 2022094276 A1 5/2003

(56) References Cited

FOREIGN PATENT DOCUMENTS

| | | | |
|---|---|---|---|
| WO | 2010112305 | A1 | 10/2010 |
| WO | 2020109539 | A1 | 6/2020 |

OTHER PUBLICATIONS

International Search Report for International Application No. PCT/US2021/057354; Date of Completion: Feb. 18, 2022; Date of Mailing: Feb. 21, 2022; 3 Pages.

IPRP Mailed May 11, 2023 for International Application No. PCT/US2021/057354; 6 Pages.

Non-Final Office Action dated Jun. 21, 2023 in U.S. Appl. No. 17/514,865.

Non-Final Office Action dated Sep. 12, 2023 in U.S. Appl. No. 17/704,383.

Written Opinion for International Application No. PCT/US2021/057354; Date of Completion: Feb. 18, 2022; Date of Mailing: Feb. 21, 2022; 5 Pages.

Notification of the First Notice to Make Rectification dated Sep. 30, 2022 in CN Application No. 202220698456.X.

AFCP Decision dated Feb. 23, 2024.

Final Office Action dated Feb. 9, 2024.

Advisory Action corresponding to U.S. Appl. No. 17/704,383; Mailing Date, Apr. 18, 2024.

U.S. Non-Final Office Action corresponding to U.S. Appl. No. 17/514,865; Mailing Date, Apr. 3, 2024.

French Search Opinion corresponding to FR Application No. 2202626; Issue Date: Jan. 29, 2025, 14 pages.

U.S. Non-Final Office Action corresponding to U.S. Appl. No. 17/704,383; Issue Date, Apr. 14, 2025, 33 pages.

CNIPA The Notification of the First Office Action corresponding to CN Application No. 202210311556.7; Issue Date, May 6, 2025, 33 pages.

U.S. Final Office Action corresponding to U.S. Appl. 17/704,383; Issue date, Jul. 24, 2025, 30 pages.

CNIPA Notification of the First Office Action corresponding to CN Application No. 202310202907.5; Issue date, Sep. 20, 2025, 18 pages.

U.S. Non-Final Office Action corresponding to U.S. Appl. No. 17/704,383; Issue date, Nov. 17, 2025, 90 pages.

CNIPA Second Office Action corresponding to CN Application No. 202310202907.5; Issue date, Apr. 1, 2026, 8 pages.

CNIPA Notification of Second Office Action corresponding to CN Application No. 202210311556.7; Issue date: Feb. 10, 2026, 15 pages.

Chinese Office Action corresponding to CN Application No. 202180073473.2; Issue date, Apr. 22, 2026, 9 pages.

Chinese Office Action corresponding to CN Application No. 202210311556.7; Issue date, Apr. 30, 2026, 13 pages.

U.S. Notice of Allowance for corresponding U.S. Appl. No. 17/704,383; Issue date, Jun. 17, 2026, 86 pages.

* cited by examiner

WINDOW REGULATOR FOR A FRAMELESS SYSTEM

CROSS REFERENCE TO RELATED APPLICATIONS

This application claims the benefit of U.S. Provisional Patent Application No. 63/316,083 filed on Mar. 3, 2022, the entire contents of which are incorporated herein by reference thereto.

TECHNICAL FIELD

Exemplary embodiments pertain to the art of vehicles, and more particularly to window regulators for vehicles.

BACKGROUND

Passenger vehicles typically have windows surrounding the passenger compartment. Windows in doors of the vehicle may be designed to be raised and lowered electrically by an operator. The operator may be the driver or a passenger usually using an interior switch. The physical raising and lowering of a window is performed by an electromechanical device referred to as a window regulator. The window regulator is typically located within a vehicle door cavity.

In a frameless door assembly for an automotive vehicle the window has no frame surrounding its top and upper side portions of its sides when the window is in the closed position. As such, a window regulator for a frameless door assembly must provide window stability in all directions and effectuate movement of the window toward and from its associated exterior seal on the vehicle as the window approaches and leaves its closed position. In addition, it is also desirable to provide cost improvements to the window regulator wherein the window regulator is optimized in order to reduces the associated costs of manufacture.

As such, it is desirable to provide an optimized window regulator while also meeting the strength and adjustability needed for a frameless door system.

BRIEF DESCRIPTION

Disclosed is a window regulator, including: a first guide rail; a first cursor slidably mounted to the first guide rail; a second guide rail spaced from the first guide rail; a second cursor slidably mounted to the second guide rail; a housing that is not mounted to a lower end of the first guide rail; a motor mounted to the housing and operably coupled to the first cursor and the second cursor such that operation of the motor will cause the first cursor to slide along the first guide rail and second cursor to slide along the second guide rail; a cable drum rotationally mounted to the housing, the cable drum being operably coupled to the motor and a first cable secured to the cable drum at one end and the first cursor at another end; a second cable secured to the cable drum at one end and the second cursor at another end; a third cable secured to the first cursor at one end and the second cursor at another end; a first cable sheath surrounding the first cable that extends from a first feature of the first guide rail to the housing; a cable tensioner associated with the first cable sheath; a second cable sheath surrounding the second cable that extends from the housing to a second feature of the second guide rail; and a third cable sheath surrounding the third cable that extends from the a second feature of the first guide rail to a first feature of the second guide rail, wherein the window regulator is configured for raising and lowering a window of a frameless door assembly of a vehicle.

In addition to one or more of the features described above, or as an alternative to any of the foregoing embodiments, a pulley is rotationally mounted to each of the first feature of the first guide rail, the second feature of the second guide rail, the first feature of the second guide rail and the second feature of the second guide rail.

In addition to one or more of the features described above, or as an alternative to any of the foregoing embodiments, the first guide rail and the second guide rail are hollow structures.

In addition to one or more of the features described above, or as an alternative to any of the foregoing embodiments, the first guide rail has a rectangular periphery and a portion of the first cursor completely surrounds the first guide rail and wherein the second guide rail has a rectangular periphery and a portion of the second cursor completely surrounds the second guide rail.

In addition to one or more of the features described above, or as an alternative to any of the foregoing embodiments, the first guide rail and the second guide rail are hollow.

In addition to one or more of the features described above, or as an alternative to any of the foregoing embodiments, the portion of the first cursor surrounding the first guide rail has multiple contact points with the first guide rail in order to prevent undesired movement of the first cursor as it slides up and down the first guide rail, and wherein the portion of the second cursor surrounding the second guide rail has multiple contact points with the second guide rail in order to prevent undesired movement of the second cursor as it slides up and down the second guide rail.

In addition to one or more of the features described above, or as an alternative to any of the foregoing embodiments, the first cursor has an insert that defines an opening for the first guide rail to slide therethrough and the second cursor has an insert that defines an opening for the second guide rail to slide therethrough.

In addition to one or more of the features described above, or as an alternative to any of the foregoing embodiments, the insert of the first cursor is formed from polyoxymethylene (POM) and a portion of the first cursor is positioned over the insert of the first cursor and the insert of the second cursor is formed from polyoxymethylene (POM) and a portion of the second cursor is positioned over the insert of the second cursor.

In addition to one or more of the features described above, or as an alternative to any of the foregoing embodiments, the first cursor and the second cursor are formed from nylon.

In addition to one or more of the features described above, or as an alternative to any of the foregoing embodiments, the first guide rail is a forward guide rail and the second guide rail is a rear guide rail.

In addition to one or more of the features described above, or as an alternative to any of the foregoing embodiments, the first guide rail and the second guide rail are hollow structures.

In addition to one or more of the features described above, or as an alternative to any of the foregoing embodiments, the first guide rail has a rectangular periphery and a portion of the first cursor completely surrounds the first guide rail and wherein the second guide rail has a rectangular periphery and a portion of the second cursor completely surrounds the second guide rail.

In addition to one or more of the features described above, or as an alternative to any of the foregoing embodiments, wherein the first guide rail and the second guide rail are hollow.

In addition to one or more of the features described above, or as an alternative to any of the foregoing embodiments, the portion of the first cursor surrounding the first guide rail has multiple contact points with the first guide rail in order to prevent undesired movement of the first cursor as it slides up and down the first guide rail, and wherein the portion of the second cursor surrounding the second guide rail has multiple contact points with the second guide rail in order to prevent undesired movement of the second cursor as it slides up and down the second guide rail.

In addition to one or more of the features described above, or as an alternative to any of the foregoing embodiments, wherein the first cursor has an insert that defines an opening for the first guide rail to slide therethrough and the second cursor has an insert that defines an opening for the second guide rail to slide therethrough.

In addition to one or more of the features described above, or as an alternative to any of the foregoing embodiments, the insert of the first cursor is formed from polyoxymethylene (POM) and a portion of the first cursor is positioned over the insert of the first cursor and the insert of the second cursor is formed from polyoxymethylene (POM) and a portion of the second cursor is positioned over the insert of the second cursor.

In addition to one or more of the features described above, or as an alternative to any of the foregoing embodiments, the first cursor and the second cursor are formed from nylon.

In addition to one or more of the features described above, or as an alternative to any of the foregoing embodiments, the first guide rail is a forward guide rail and the second guide rail is a rear guide rail.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Disclosed herein is an apparatus for raising and lowering a window of a vehicle. The apparatus may be referred to as a "window regulator". In one or more embodiments, the window regulator is an electromechanical device that can be controlled by a user inside the vehicle such as by operating a switch.

More particularly, the present disclosure is directed to a window regulator configured to use with a frameless door assembly for an automotive vehicle. As such, the window of the frameless door assembly has no frame surrounding the top and upper side portions of the window as it sides up and down and when it is in a closed position (e.g., fully extended from a sill of the vehicle door).

Figure 1:
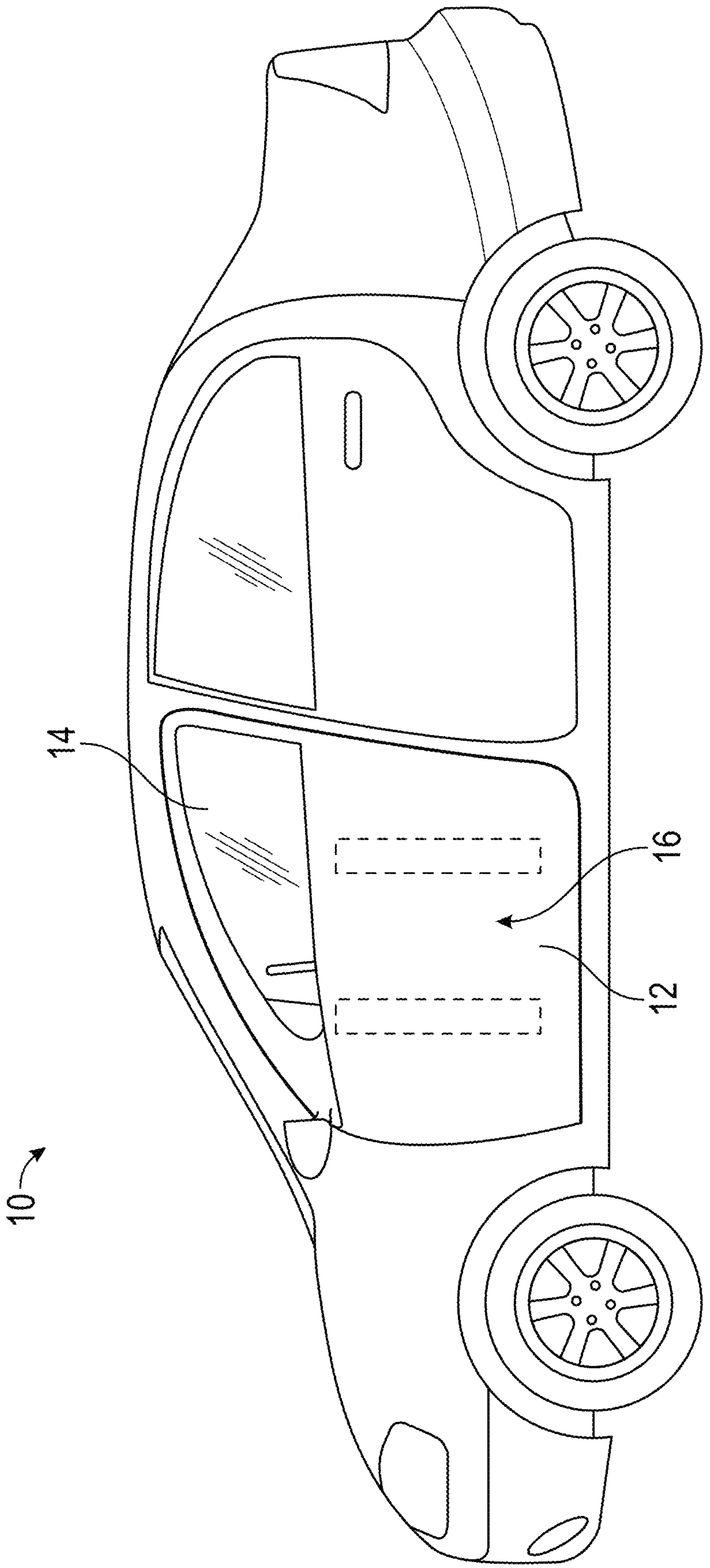
FIG. 1 is a partial view of a vehicle having a window regulator according to the present disclosure.

Referring now to FIG. 1 is a partial side view of a vehicle 10 having at least one door 12 with a window 14 that is configured to be raised and lowered by a window regulator 16 disposed within door panels (e.g., exterior and interior) of the door 12. Although, only one door 12 and window 14 is illustrated it is contemplated that the window regulator or the present disclosure can be used in a vehicle having numerous doors and associated windows. As such, one or more other windows 14 of the vehicle 10 may also be operated by a window regulator 16 according to the present disclosure.

Figure 2A:
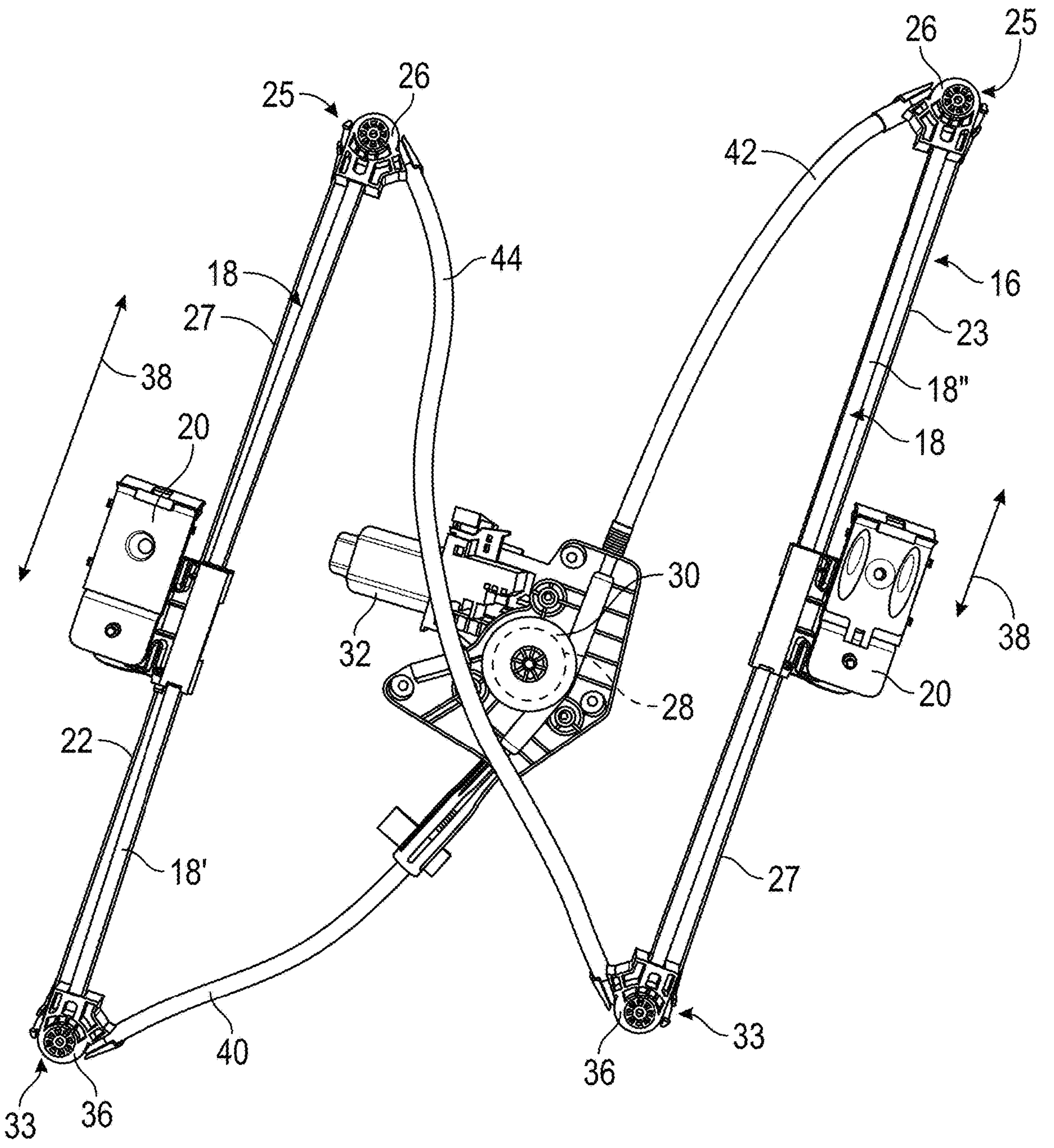
FIG. 2A is a front perspective view of a window regulator according to the present disclosure.
Figure 2B:
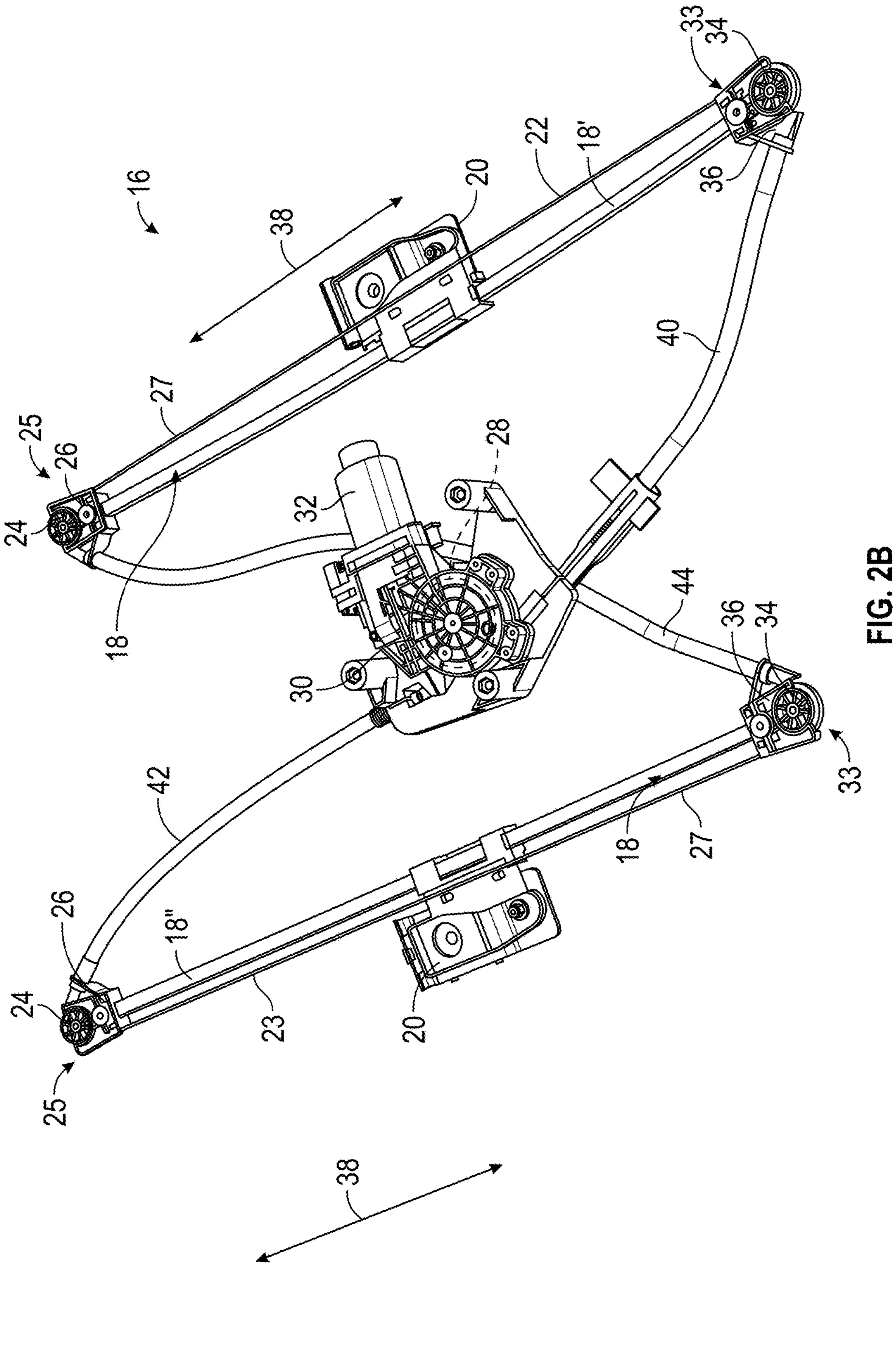
FIG. 2B is a rear perspective view of a window regulator according to the present disclosure.
Figure 3:
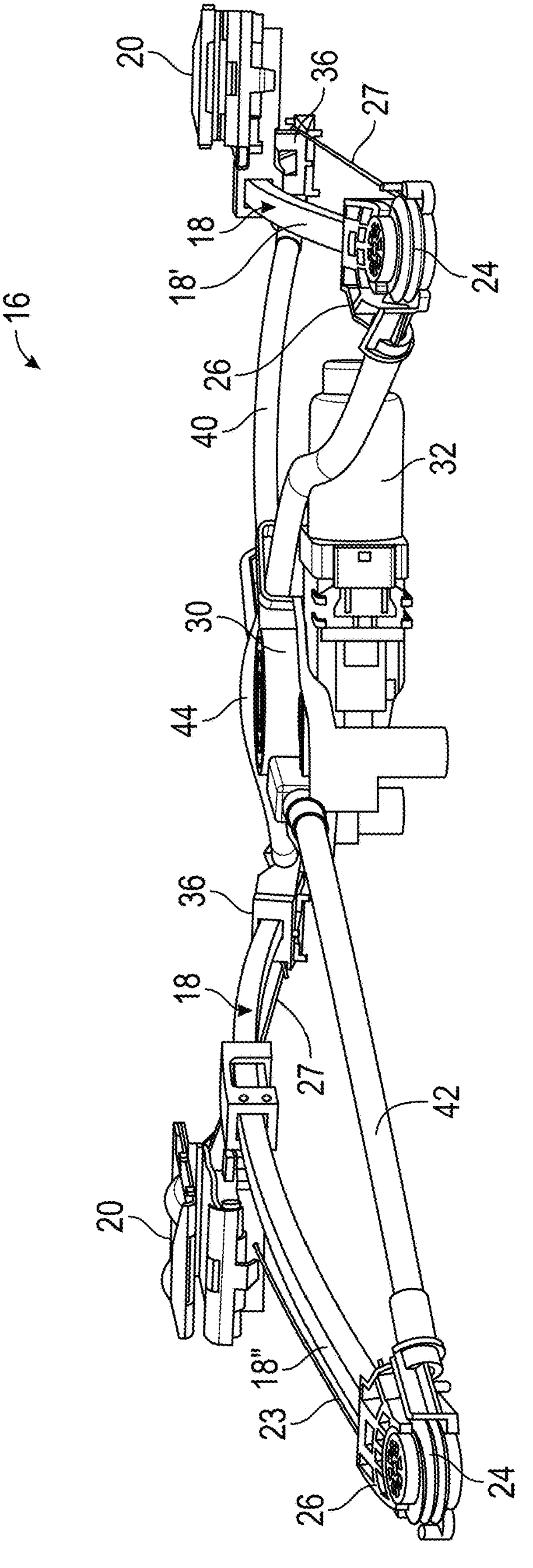
FIG. 3 is a top perspective view of a window regulator according to the present disclosure.
Figure 4:
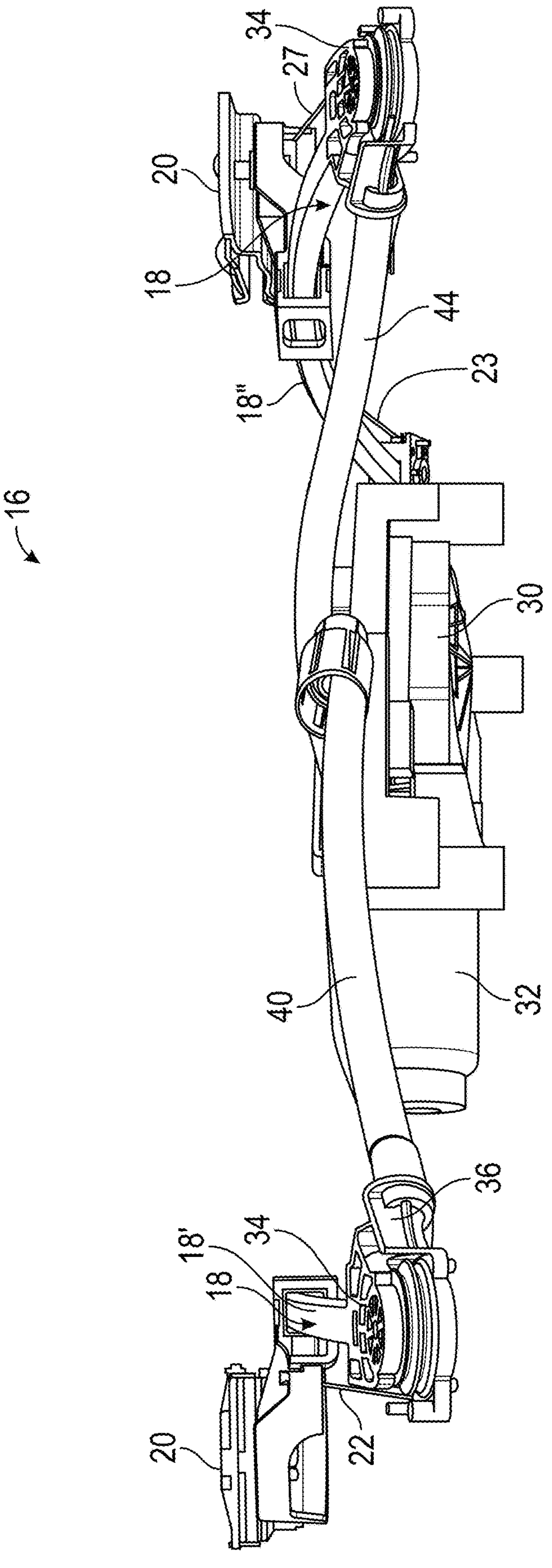
FIG. 4 is a bottom perspective view of a window regulator according to the present disclosure.

In FIGS. 2A and 2B perspective views of the window regulator 16 are illustrated. The window regulator 16 includes a pair of guide rails 18 each having a cursor 20 that is slidably secured to a respective guide rail 18 of the pair of guide rails 18. The pair of guide rails 18 may be referred to as a first guide rail 18' and a second guide rail 18". In the illustrated embodiment, the first guide rail 18' is located closer a forward portion of the vehicle or vehicle door than the second guide rail 18" when the window regulator 16 is secured to the vehicle door. As such, the second guide rail 18" is located closer a rear portion of the vehicle or vehicle door than the first guide rail 18' when the window regulator 16 is secured to the vehicle door. In addition, the corresponding cursor may be referred to as a first cursor 20 and a second cursor 20. Each cursor 20 is configured to be secured to the window 14 and each cursor 20 is operably coupled to a pair of cables.

Each one of the pair of guide rails 18 of the window regulator 16 has an upper pulley 24 or upper cam that is secured to a top portion or top end 25 of each guide rail 18 by a housing or feature 26. As illustrated, the upper pulley 24 or upper cam is aligned with the guide rail 18. In the event a pulley is used, the upper pulley 24 is rotationally received in the housing or feature 26. The upper pulley or upper cam is configured to receive either rotationally or slidably a cable. For example, a first cable 22 is secured to one of the pair of cursors 20 at one end and a cable drum 28 at an opposite end and a second cable 23 is secured to the other one of the pair of cursors 20 at one end and the cable drum 28 at an opposite end. In addition, a third cable 27 is secured to one of the pair of cursors 20 at one end and the other one of the pair of cursors 20 at an opposite end.

The cable drum 28 is rotationally mounted to a housing 30. In order to provide rotational movement to the cable drum 28, a motor 32 is operably coupled to the cable drum 28 by for example a worm drive (not shown) that is rotated by the motor 32. In one embodiment, the housing 30 is not secured either guide rail 18 such that it is free floating with respect to the guide rails 18. In yet another alternative embodiment, the housing 30 may be secured to the top end 25 of either the first guide rail 18' or the second guide rail 18". As used herein, the top end 25 of the guide rail 18 is located closer to a top of the vehicle door 12 than a bottom end 33 of the guide rail 18 when the window regulator 16 is secured to the vehicle door 12. Still further and in yet another alternative embodiment, the housing 30 is secured to the bottom end 33 of the second guide rail 18". However and as will be discussed below, in any of the above embodiments the housing 30 is not secured to the bottom end 33 of the first or forward guide rail 18'.

The guide rails 18 also have a lower pulley 34 or lower cam secured to a housing or feature 36 that is secured to the bottom end 33 of the guide rail 18. In the event a pulley is used, the lower pulley 34 is rotationally received in the housing or feature 36. As illustrated, the lower pulley 34 or lower cam is aligned with the guide rail 18. The lower pulley 34 or lower cam is configured to rotationally or slidably received one of the cables.

As mentioned above, a first cable 22 is secured to one of the pair of cursors 20 at one end and a cable drum 28 at an opposite end and a second cable 23 is secured to the other one of the pair of cursors 20 at one end and the cable drum 28 at an opposite end. In addition, a third cable 27 is secured to one of the pair of cursors 20 at one end and the other one of the pair of cursors 20 at an opposite end.

As the cable drum 28 is rotated either the first cable 22 or second cable 23 will wind up on the cable drum 28 while the other unwinds thus causing movement of the cursor 20 in the directions of arrows 38. In addition, cable 27 which is not connected to the cable drum 28 will move accordingly. For example, the cable 27 is attached to a top portion of one cursor 20 at one end and a bottom portion of the other cursor 20 at its opposite end. Movement of the cursors 20 in the directions of arrows 38 will cause the window 14 to move up and down with respect to the vehicle door 12.

The window regulator 16 also includes a first cable sheath 40 for the first cable 22 that extends from the housing or feature 36 of the first or forward guide rail 18' to the housing 30. In addition, a second cable sheath 42 extends from the housing 30 to the housing or feature 26 of the second or rear guide rail 18". Still further, a third cable sheath 44 extends from a housing or feature 36 of the second or rear guide rail 18" and the housing or feature 26 of the first or forward guide rail 18'. As mentioned above, the first guide rail 18' is a forward guide rail 18 and the second guide rail 18" is a rearward guide rail. As used herein forward guide rail 18 means the guide rail 18 of the pair of guide rails 18 that is closer to a forward portion of the vehicle 10 when the window regulator 16 is secured to the vehicle and the rearward guide rail 18 means the guide rail 18 of the pair of guide rails that is closer to a rearward portion of the vehicle when the window regulator 16 is secured to the vehicle 10.

The first cable 22 is slidably received within the first cable sheath 40, and the second cable 23 is slidably received in the second cable sheath 42, and the third cable 27 is slidably received in the third cable sheath 44. These cables 22, 23 and 27 and their associated cable sheaths 40, 42, and 44 are referred to as Bowden cables. The first cable sheath 40 also includes an irreversible tensioner or spring tensioner 41 such that slack in the first cable 22 is absorbed as is known in the related arts. One non-limiting example of an irreversible tensioner 41 is described in U.S. Pat. No. 8,555,549, the entire contents of which are incorporated herein by reference thereto. As such, the first cable 22 may be referred to as a slack side cable and thus the housing 30 is not be secured to the bottom end 33 of the first or forward guide rail 18' such that the irreversible tensioner 41 can be associated with the first cable 22.

In one non-limiting embodiment, the guide rails 18 are hollow tubes or structures formed from a metal such as aluminum, steel, metallic alloys or the hollow tube formed from a plastic material, or a plastic composite material. In one alternative, the guide rails 18 are extruded structures that have internal structural features, supports or ribs that extend across a cavity of the guide rail. In this embodiment the internal structural features, supports or ribs extend from an interior surface of the wall or walls that define an exterior surface of the guide rail 18. The exterior surface being opposite to the interior surface of the wall or walls. Examples of such guide rails 18 are found in the following U.S. patent application Ser. No. 17/514,865 filed on Oct. 29, 2021 and U.S. Provisional Patent Application Ser. No. 63/166,777 filed on Mar. 26, 2021 the contents each of which are incorporated herein by reference thereto.

In accordance with one embodiment of the present disclosure, the guide rails 18 are formed such that they have an overall lower mass, smaller size than compared with guide rails of window regulator currently in used. The overall lower mass and smaller size of the guide rails allows the costs associated with their manufacture to be much less. As such, lower cost, smaller size and lower mass guide rails are desirable. However, these lower cost, smaller size and lower mass guide rails must also be able to provide the desired structural integrity required of the window regulator 16, which is provided by the exemplary embodiments of the present disclosure. As used herein low mass refers to a guide rail having a mass of less than 150 grams. As used herein, smaller size refers to a guide rail having an exterior profile for example a square or rectangular configuration wherein the dimensions of the exterior profile of the square or rectangular configuration of the guide rail are no greater than 10 mm.

Moreover and when the guide rails 18 are formed in such a manner (e.g., low mass and smaller size (square or rectangle exterior profile) the guide rails 18 are typically stiffer than a stamped guide rail.

In addition and in one non-limiting embodiment, the housing portion 30 and the housing or feature 26 are formed from an easily molded material such as a plastic material, metal insert reinforced plastic or a plastic composite material. Alternatively, the guide rail 18 may be solid. In various embodiments of the present disclosure, the guide rail may have a square or rectangular configuration or periphery.

Not shown are a controller for controlling the motor 32 and inputs to the controller such as user operated switches and a vehicle control module that may also provide input to the controller. Also not shown is an electric power supply system, which may include a battery and alternator as vehicle electric power supply systems and window controllers are well known in the art, these components are not discussed in further detail.

In one embodiment, the cursor 20 or a portion thereof is configured to completely surround a periphery of the guide rail 18. As such, the portion of the cursor 20 surrounding the guide rail 18 will have multiple contact points with the guide rail in order to provide multiple points of contact in order to prevent undesired twisting or rotation of the cursor as it slides up and down the guide rail 18 in the direction of arrows 38. In being understood, the some minor rotation or twisting of the cursor 20 about an axis (extending generally in the direction of arrows 38) of the guide rail 18 is acceptable for operation of the window regulator.

In yet another alternative embodiment, the guide rail 18 may be a three sided structure with an opening or channel such as a substantially “C” or “U” shaped configuration when viewed from an end or in a cross-sectional view. In one non-limiting embodiment, the guide rail 18 may be formed as a single unitary piece that may be formed from a metal such as aluminum, steel, metallic alloys or the guide rail 18 is formed from a plastic material, or a plastic composite material.

When a cursor 20 is used that has a portion that completely surrounds the guide rail 18 and the housing 36 or 26 is secured to the lower end or upper end of the guide rail 18, the opposite end of the guide rail 18 has to be open so that the cursor 20 can be slid on the guide rail 18 and thereafter a housing or feature 26 or 36 is secured to the opposite end (e.g., bottom or top) after the cursor 20 is slid onto the guide rail 18. As mentioned above, the housing or feature 26 is configured to rotationally receive a pulley 24 or is formed to have a cam feature for guiding the cable 22 therethrough. In addition, the housing or feature 36 is configured to rotationally receive a pulley 34 or is formed to have a cam feature 34 for guiding the cable 22 therethrough.

Alternatively and in some of the aforementioned embodiments the cursor 20 may be only configured to ride or slide on three sides of the guide rail. In these embodiments, the cursor 20 can be snap fitted onto the guide rail 18. As such, there may be no need to leave one of the ends of the guide rail 18 open.

Figure 5:
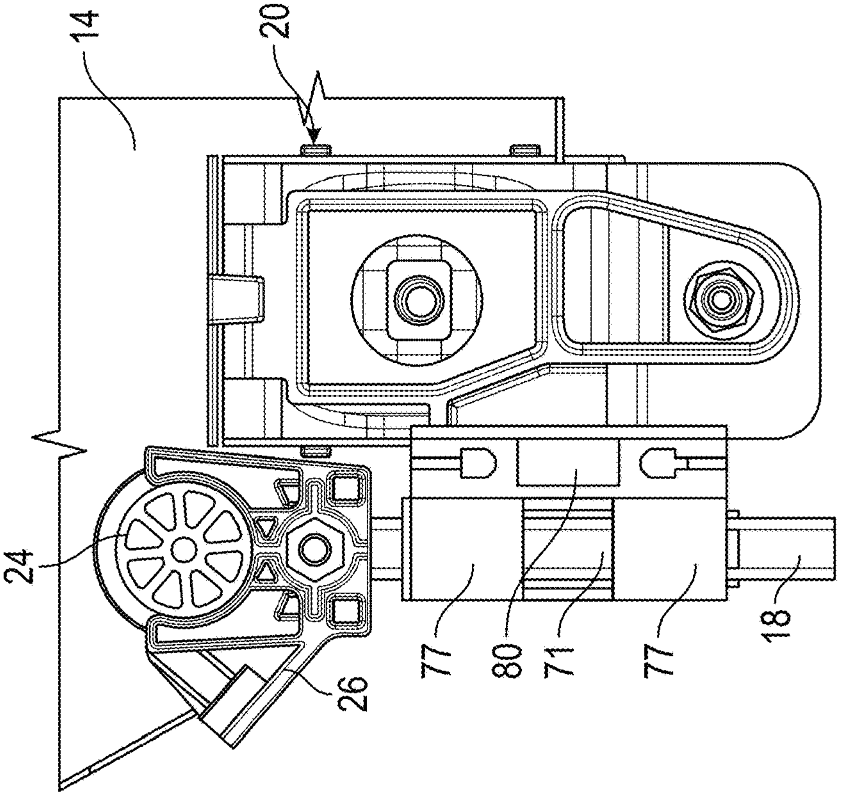
FIG. 5 illustrates the placement of a cursor on a window regulator in accordance with an embodiment of the present application.
Figure 6:
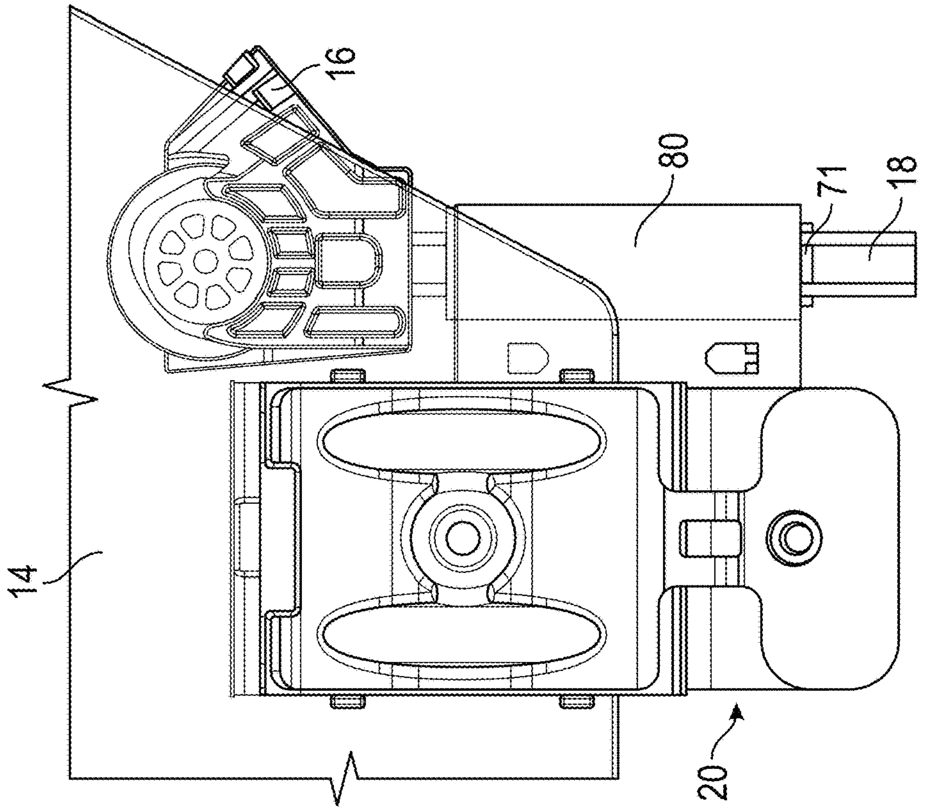
FIG. 6 is an opposite side view of FIG. 5.

Referring now to FIGS. 5 and 6, a cursor 20 contemplated for use with any of the aforementioned embodiments disclosed in the present application is illustrated. In the illustrated window regulator 16, the cursor 20 used with the guide rails 18 has a portion 80 that slidably engages the guide rail 18 and the portion 80 has at least one opening that has the same configuration of the guide rail 18.

FIG. 5 illustrates the approximate rail 18 placement through the portion 80 of the cursor 20. Referring now to FIGS. 5 and 6, the cursor 20 is configured to have a polyoxymethylene (POM) insert 71 that defines an opening for the guide rail 18 to slide therethrough. In this embodiment, the insert 71 is located within the at least opening of the portion 80. Of course, other materials are contemplated for the inset 71. In one embodiment, the guide rail 18 has a rectangular periphery and the portion 80 or insert 71 of the cursor 20 completely surrounds the guide rail 18. In other words, the portion 80 or insert 71 will have an opening configured to match the exterior of the guide rail (e.g., rectangle etc.) such that the portion 80 or insert 71 can slidably engage the guide rail 18 it is located on. For example, the opening of the portion 80 or insert 71 is slightly larger than the exterior of the guide rail 18 so that the slidable movement of the cursor 20 along the guide rail 18 is possible.

In one embodiment, the portion 80 of the cursor 20 is formed coextensively with the polyoxymethylene (POM) insert 71. Alternatively, the portion 80 of the cursor 20 and the insert 71 are separately formed and secured together. In one embodiment, the portion 80 of the cursor 20 is formed from nylon and the insert 71 is a polyoxymethylene (POM) insert 71. In yet one other embodiment, the portion 80 of the cursor(s) 20 are formed from an easily molded material such as a plastic material.

In one alternative embodiment, the portion of the cursor 20 may be formed from polyoxymethylene (POM) and the insert 71 may be formed from nylon.

The portion 80 of the cursor 20 may be configured to have a feature or two or multiple separate features 77 positioned about or formed coextensively with the polyoxymethylene (POM) insert 71. As such, the features 77 will match the outer periphery of the insert 71. Alternatively, the portions 80 of the cursor(s) 20 may be separately formed and the polyoxymethylene (POM) insert 71 may be separately formed and the polyoxymethylene (POM) insert 71 is slid into the feature(s) 77. In this embodiment, the openings of the features 77 will match the exterior features of the insert 71 and the interior opening of the insert will match the exterior periphery of the guide rail 18.

In addition, the cursor 20 may have a component or components that are configured to be secured to the window 14 and are adjustably secured to the portion 80 of the cursor 20 such that pivotal adjustment of the component or components and the window 14 with respect to the guide rail 18 and/or the window regulator 16 is possible. As such, pivotal adjustment of the window 14 with respect to the vehicle door 12 is possible.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates to one or more structural limitations of a device that are required for the device to perform the function or operation for which the device is configured.

The disclosure illustratively disclosed herein may be practiced in the absence of any element which is not specifically disclosed herein.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A window regulator, comprising:

a first guide rail;

a first cursor slidably mounted to the first guide rail;

a second guide rail spaced from the first guide rail;

a second cursor slidably mounted to the second guide rail;

a housing that is not mounted to either the first guide rail or the second guide rail such that the housing is free floating with respect to the first guide rail and the second guide rail;

a motor mounted to the housing and operably coupled to the first cursor and the second cursor such that operation of the motor will cause the first cursor to slide along the first guide rail and second cursor to slide along the second guide rail;

a cable drum rotationally mounted to the housing, the cable drum being operably coupled to the motor;

a first cable secured to the cable drum at one end and the first cursor at another end;

a second cable secured to the cable drum at one end and the second cursor at another end;

a third cable secured to the first cursor at one end and the second cursor at another end;

a first cable sheath surrounding the first cable that extends from a first feature of the first guide rail to the housing;

a cable tensioner associated with the first cable sheath;

a second cable sheath surrounding the second cable that extends from the housing to a second feature of the second guide rail; and a third cable sheath surrounding the third cable that extends from a second feature of the first guide rail to a first feature of the second guide rail, wherein the window regulator is configured for raising and lowering a window of a frameless door assembly of a vehicle, wherein the first guide rail has a rectangular periphery and a portion of the first cursor completely surrounds the first guide rail and the second guide rail has a rectangular periphery and a portion of the second cursor completely surrounds the second guide rail.

2. The window regulator as in claim 1, further comprising a pulley rotationally mounted to each of the first feature of the first guide rail, the second feature of the second guide rail, the first feature of the second guide rail and the second feature of the second guide rail.

3. The window regulator as in claim 2, wherein the first guide rail and the second guide rail are hollow.

4. The window regulator as in claim 2, wherein the portion of the first cursor surrounding the first guide rail has multiple contact points with the first guide rail in order to prevent undesired movement of the first cursor as the first cursor slides up and down the first guide rail, and wherein the portion of the second cursor surrounding the second guide rail has multiple contact points with the second guide rail in order to prevent undesired movement of the second cursor as the second cursor slides up and down the second guide rail.

5. The window regulator as in claim 2, wherein the first cursor has an insert that defines an opening for the first guide rail to slide therethrough and the second cursor has an insert that defines an opening for the second guide rail to slide therethrough.

6. The window regulator as in claim 5, wherein the insert of the first cursor is formed from polyoxymethylene (POM) and a portion of the first cursor is positioned over the insert of the first cursor and the insert of the second cursor is formed from polyoxymethylene (POM) and a portion of the second cursor is positioned over the insert of the second cursor.

7. The window regulator as in claim 6, wherein the first cursor and the second cursor are formed from nylon.

8. The window regulator as in claim 7, wherein the first guide rail is a forward guide rail and the second guide rail is a rear guide rail.

9. The window regulator as in claim 1, wherein the first guide rail and the second guide rail are hollow.

10. The window regulator as in claim 1, wherein the portion of the first cursor surrounding the first guide rail has multiple contact points with the first guide rail in order to prevent undesired movement of the first cursor as the first cursor slides up and down the first guide rail, and wherein the portion of the second cursor surrounding the second guide rail has multiple contact points with the second guide rail in order to prevent undesired movement of the second cursor as the second cursor slides up and down the second guide rail.

11. The window regulator as in claim 1, wherein the first cursor has an insert that defines an opening for the first guide rail to slide therethrough and the second cursor has an insert that defines an opening for the second guide rail to slide therethrough.

12. The window regulator as in claim 11, wherein the insert of the first cursor is formed from polyoxymethylene (POM) and a portion of the first cursor is positioned over the insert of the first cursor and the insert of the second cursor is formed from polyoxymethylene (POM) and a portion of the second cursor is positioned over the insert of the second cursor.

13. The window regulator as in claim 12, wherein the first cursor and the second cursor are formed from nylon.

14. The window regulator as in claim 1, wherein the first guide rail is a forward guide rail and the second guide rail is a rear guide rail.

* * * * *